US006337138B1

(12) United States Patent
Zehner et al.

(10) Patent No.: US 6,337,138 B1
(45) Date of Patent: Jan. 8, 2002

(54) CELLULOSIC, INORGANIC-FILLED PLASTIC COMPOSITE

(75) Inventors: Burch E. Zehner, Gahanna; Bryan K. Buhrts, Reynoldsburg, both of OH (US)

(73) Assignee: Crane Plastics Company Limited Partnership, Columbus, OH (US)

( * ) Notice: Subject to any disclaimer, the term of this patent is extended or adjusted under 35 U.S.C. 154(b) by 0 days.

(21) Appl. No.: 09/473,377

(22) Filed: Dec. 28, 1999

Related U.S. Application Data

(60) Provisional application No. 60/113,987, filed on Dec. 28, 1998.

(51) Int. Cl.[7] .............................................. B32B 23/08

(52) U.S. Cl. ......................... 428/511; 428/13; 428/451; 428/502; 264/142; 264/143; 264/176.1; 428/500; 428/507; 428/512; 428/326; 428/361

(58) Field of Search ......................... 524/451, 13, 502; 264/142, 143, 176.1; 428/500, 507, 511, 512, 326, 361

(56) References Cited

U.S. PATENT DOCUMENTS 2,188,396 A 1/1940 Semon .......................... 18/55
2,489,373 A 11/1949 Gilman ........................ 260/37
2,519,442 A 8/1950 Delorme et al. .................. 260
2,935,763 A 5/1960 Newman et al. ............... 18/55
3,287,480 A 11/1966 Wechsler et al. ........... 264/122
3,562,373 A 2/1971 Logrippo .................... 264/118
3,645,939 A 2/1972 Gaylord ............... 260/17.4 GC
3,864,201 A 2/1975 Susuki et al. ............... 161/160
3,867,493 A 2/1975 Seki .......................... 264/45.9
3,878,143 A 4/1975 Baumann et al. ...... 260/17.4 R
3,879,505 A 4/1975 Boutillier et al. ............. 264/48
3,888,810 A 6/1975 Shinomura ........... 260/17.4 BB
3,922,328 A 11/1975 Johnson ..................... 264/46.1
3,943,079 A 3/1976 Hamed ................ 260/17.4 BB
3,954,555 A 5/1976 Kole et al. .................. 162/136
3,956,541 A 5/1976 Pringle .......................... 428/2
4,012,348 A 3/1977 Chelland et al. ....... 260/28.5 R
4,016,232 A 4/1977 Pringle ....................... 264/112
4,016,233 A 4/1977 Pringle ....................... 264/122
4,018,722 A 4/1977 Baker ......................... 260/2.3
4,029,831 A 6/1977 Daunheimer ................ 427/264
4,045,603 A 8/1977 Smith ............................ 428/2
4,056,591 A 11/1977 Goettler et al. ............. 264/108
4,071,479 A 1/1978 Broyde et al. ............... 260/2.3
4,071,494 A 1/1978 Gaylord ................... 260/42.14
4,097,648 A 6/1978 Pringle ....................... 428/326
4,102,106 A 7/1978 Golder et al. ................. 52/533
4,107,110 A 8/1978 Lachowicz et al. .. 260/17.4 CL
4,145,389 A 3/1979 Smith ........................ 264/40.7
4,157,415 A 6/1979 Lindenberg ................. 428/284
4,168,251 A 9/1979 Schinzel et al. ....... 260/17.4 R
4,178,411 A 12/1979 Cole et al. .................. 428/310
4,181,764 A 1/1980 Totten ........................ 428/155
4,187,352 A 2/1980 Klobbie ....................... 521/79
4,191,798 A 3/1980 Schumacher et al. ......... 428/95
4,203,876 A 5/1980 Dereppe et al. ....... 260/17.4 R
4,207,373 A * 6/1980 Segal ......................... 428/251
4,228,116 A 10/1980 Colombo et al. ........... 264/119
4,239,679 A 12/1980 Rolls et al. .............. 260/42.49
4,241,133 A 12/1980 Lund et al. ................. 428/326
4,244,903 A 1/1981 Schnause ..................... 264/68
4,248,743 A 2/1981 Goettler ............... 260/17.4 BB
4,250,222 A 2/1981 Mavel et al. ............... 428/285
4,263,184 A 4/1981 Leo et al. ............ 260/17.4 CL
4,263,196 A 4/1981 Schumacher et al. ...... 260/33.6
4,272,577 A 6/1981 Lyng .......................... 428/112
4,273,688 A 6/1981 Porzel et al. .......... 260/17.4 R
4,303,019 A 12/1981 Haataja et al. ............. 108/51.1
4,305,901 A 12/1981 Prince et al. ........... 264/176 R
4,317,765 A 3/1982 Gaylord ...................... 523/204
4,323,625 A 4/1982 Coran et al. ................ 428/361
4,376,144 A 3/1983 Goettler ....................... 428/36
4,382,758 A 5/1983 Nopper et al. ............. 425/82.1
4,414,267 A 11/1983 Coran et al. ................ 428/288
4,420,351 A 12/1983 Lussi et al. ................ 156/62.4
4,430,468 A 2/1984 Schumacher ................ 524/109
4,480,061 A 10/1984 Coughlin et al. ............. 524/13
4,481,701 A 11/1984 Hewitt ........................ 29/416

(List continued on next page.)

FOREIGN PATENT DOCUMENTS

| | | |
|---|---|---|
| DE | 2042176 | 4/1971 |
| DE | 44033/73 | 9/1973 |
| DE | 3801574 | 1/1988 |
| EP | 93306843 | 8/1993 |
| EP | 93306844 | 8/1993 |
| EP | 93306845 | 8/1993 |
| FR | 74 06548 | 2/1974 |
| FR | 76 28288 | 9/1976 |
| FR | 79 10288 | 4/1979 |
| FR | 84 07466 | 5/1984 |
| GB | UK2036 148 A | 6/1980 |
| GB | 8223635 | 8/1982 |
| GB | 86 04589 | 2/1986 |
| GB | 87 02959 | 2/1987 |
| WO | PCT/SE90/00014 | 1/1990 |

OTHER PUBLICATIONS

Bendsten et al., Mechanical Properties of Wood, pp. 4–2 to 4–44.

Bibliography of Sold Phase Extrusion, pp. 187–195.

Brzoskowski et al., Air–Lubricated Die for Extrusion of Rubber Compounds, Rubber Chemistry and Technology, vol. 60, pp. 945–956. /37

(List continued on next page.)

*Primary Examiner*—Samuel A. Acquah
(74) *Attorney, Agent, or Firm*—Standley & Gilcrest LLP

(57) ABSTRACT

The present invention is a cellulosic, inorganic-filled plastic composite. The composite includes about 30% to about 70% by weight of the composite of cellulosic material, about 1% to about 20% by weight of the composite of talc, and about 25% to about 40% by weight of the composite of polyethylene. An extruded article and a method of making the cellulosic, inorganic-filled plastic composite are also disclosed.

33 Claims, No Drawings

U.S. PATENT DOCUMENTS

| | | | | |
|---|---|---|---|---|
| 4,491,553 A | | 1/1985 | Yamada et al. | 264/51 |
| 4,503,115 A | | 3/1985 | Hemels et al. | 428/281 |
| 4,505,869 A | | 3/1985 | Nishibori | 264/115 |
| 4,506,037 A | | 3/1985 | Suzuki et al. | 521/82 |
| 4,508,595 A | | 4/1985 | Gåsland | 162/158 |
| 4,562,218 A | | 12/1985 | Fornadel et al. | 524/15 |
| 4,594,372 A | | 6/1986 | Natov et al. | 523/208 |
| 4,597,928 A | | 7/1986 | Terentiev et al. | 264/87 |
| 4,610,900 A | | 9/1986 | Nishibori | 428/15 |
| 4,645,631 A | | 2/1987 | Hegenstaller et al. | 264/69 |
| 4,659,754 A | | 4/1987 | Edwards et al. | 523/214 |
| 4,687,793 A | | 8/1987 | Motegi et al. | 523/200 |
| 4,717,742 A | | 1/1988 | Beshay | 523/203 |
| 4,737,532 A | | 4/1988 | Fujita et al. | 524/13 |
| 4,783,493 A | | 11/1988 | Motegi et al. | 524/13 |
| 4,789,604 A | | 12/1988 | van der Hoeven | 428/503 |
| 4,791,020 A | * | 12/1988 | Kokta | 428/326 |
| 4,801,495 A | | 1/1989 | van der Hoeven | 428/286 |
| 4,818,604 A | | 4/1989 | Tock | 428/319.9 |
| 4,820,749 A | | 4/1989 | Beshay | 523/203 |
| 4,851,458 A | | 7/1989 | Hopperdietzel | 523/205 |
| 4,889,673 A | | 12/1989 | Takimoto | 264/118 |
| 4,894,194 A | | 1/1990 | Warych | 264/68 |
| 4,915,764 A | | 4/1990 | Miani | 156/244.19 |
| 4,927,572 A | | 5/1990 | van der Hoeven | 264/22 |
| 4,927,579 A | | 5/1990 | Moore | 264/101 |
| 4,935,182 A | | 6/1990 | Ehner et al. | 264/112 |
| 4,968,463 A | | 11/1990 | Levasseur | 264/40.1 |
| 5,008,310 A | | 4/1991 | Beshay | 524/13 |
| 5,009,586 A | | 4/1991 | Pallmann | 425/311 |
| 5,064,592 A | | 11/1991 | Ueda et al. | |
| 5,075,359 A | | 12/1991 | Castagna et al. | 524/13 |
| 5,078,937 A | | 1/1992 | Eela | 264/109 |
| 5,082,605 A | | 1/1992 | Brooks et al. | 264/40.6 |
| 5,087,400 A | | 2/1992 | Theuveny | 264/115 |
| 5,088,910 A | | 2/1992 | Goforth et al. | 425/142 |
| 5,096,046 A | | 3/1992 | Goforth et al. | 198/604 |
| 5,096,406 A | | 3/1992 | Brooks | 425/205 |
| 5,120,776 A | | 6/1992 | Raj et al. | 524/13 |
| 5,153,241 A | | 10/1992 | Beshay | 524/8 |
| 5,194,461 A | | 3/1993 | Bergquist et al. | 524/13 |
| 5,272,000 A | | 12/1993 | Chenoweth et al. | 428/283 |
| 5,276,082 A | | 1/1994 | Forry et al. | 524/504 |
| 5,288,772 A | | 2/1994 | Hon | 524/35 |
| 5,302,634 A | | 4/1994 | Mushovic | 523/219 |
| 5,369,147 A | | 11/1994 | Mushovic | 523/219 |
| 5,406,768 A | | 4/1995 | Giuseppe et al. | 52/730.4 |
| 5,458,834 A | | 10/1995 | Faber et al. | 264/109 |
| 5,474,722 A | | 12/1995 | Woodhams | 264/45.3 |
| 5,480,602 A | | 1/1996 | Nigaich | 264/122 |
| 5,486,553 A | | 1/1996 | Deaner et al. | 524/13 |
| 5,497,594 A | | 3/1996 | Giuseppe et al. | 52/730.4 |
| 5,516,472 A | | 5/1996 | Laver | 264/118 |
| 5,518,677 A | | 5/1996 | Deaner et al. | 264/142 |
| 5,532,065 A | | 7/1996 | Gübitz | 428/480 |
| 5,539,027 A | | 7/1996 | Deaner et al. | 524/13 |
| 5,576,374 A | | 11/1996 | Betso et al. | 524/451 |
| 5,585,155 A | | 12/1996 | Heikkila et al. | 428/36.7 |
| 5,593,625 A | | 1/1997 | Riebel et al. | 264/115 |
| 5,938,994 A | * | 8/1999 | English et al. | 264/102 |

OTHER PUBLICATIONS

Collier et al., High Strength Extrudates by Melt Transformation Coextrusion, ANTEC, 1987, pp. 497–502.

Collier et al., Streamlined Dies and Profile Extrusion, ANTEC, 1987, pp. 203–206.

Company News Pastics Industry News, May 1994, pp. 70–71.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B. F. Goodrich, Geon Vinyl Division, section 1, pp.2–15.

Fill Thermoplastics with Wood, Modern Plastics International, Oct. 1996, pp. 12–15.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Construction, vol. 9 No. 5, 1986, pp. 5–6.

Henrici–Olive et al., Integral/Structural Ploymer Foams, Technology, Properties and Applications, Springer–Verlag, pp. 111–122.

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp.87–118.

Kokta et al., Composites of Polyvinyl Chloride–Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Québec à Trois–Rivières, Canada.

Kokta et al., Use of Wood Fibers in Thermoplastic Composites, Polymer Composites, Oct. 1983, pp. 229–232.

Maldas, et al., Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529–539 (1989).

Maldas et al., Composites of Polyvinyl Chloride–Wood Fibers: IV. Effect of the Nature of Fibers, Journal of Vinyl Technology , Jun. 1989, pp. 90–98.

Myers et al., Bibliography: Composites from Plastics and Wood–Based Fillers, USDA Forest Products Laboratory, Madison, WI, pp. 1–27 odds (1991).

Myers et al., Effects Composition and Polypropylene Melt Flow on Polypropylene–Waste Newspaper Composites, ANTEC, 1984, pp. 602–604.

Myers et al., Wood Fiber/Polymer Composites: Fundamental Concepts, Processes, and Material Options, Wood flour and polypropylene or high–density polyethylene composites: influence of maleated polypropylene concentration and extrusion temperature on properties, pp.49–56.

Pornnimit et al., Extrusion Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Resin Stretching: Accent Performance, Modern Plastic International, Jan. 1974, pp. 58–60.

Sonwood outline, Apr. 1975.
Sonwood: a new PVC wood–flour alloy for Extrusions and other Plastic Processing Techniques, Sonesson Plast AB, Malmo, Sweden.
Stage, Makromol. Chem., Macromol, Symp., No. 29, pp. 314–320(1989).
Techno Material, Techno Material Co., Ltd.
Thomas et al., Wood Fibers as Reinforcing Fillers for Polyolefins, ANTEC, 1984, pp. 687–689.
Wood Filled PVC, Plastics Industry News, Jul. 1996, pp. 6.
Woodhams et al., Wood Fibers as Reinforcing Fillers for Polyolefins, Polymer Engineering and Science, Oct. 1984, pp. 1166–1171.
Yam et al., Composites from Compounding Wood Fibers With Recycled High Density Polyethylene, Polymer Engineering and Science, mid–Jun. 1990, pp. 693–699.

Yuskova, et al., Interaction of Components in Poly(Vinyl Choloride) Filled in Polymetization.

Zadorecki et al., Future Prospects for Wood Cellulose as Reinforcement In Organic Polymer Composites, Polymer Composites, Apr. 1989, pp. 69–77.

* cited by examiner

CELLULOSIC, INORGANIC-FILLED PLASTIC COMPOSITE

This application claims the benefit of U.S. Provisional Application No. 60/113,987, filed Dec. 28, 1998.

BACKGROUND AND SUMMARY OF THE INVENTION

The application relates generally to cellulose-reinforced composites and, more particularly, to a cellulosic, inorganic-filled plastic composite.

There is a very high demand for wood products. Although wood is a renewable resource, it takes many years for trees to mature. Consequently, the supply of wood suitable for use in construction is decreasing. Therefore, there is a need to develop alternatives to the use of wood in construction.

Cellulosic materials, such as wood fiber, wood flour, sawdust, rice hulls, peanut shells, and the like, have long been added to thermoplastic compounds to achieve a wood-like composite providing reinforcement, reduced coefficient of expansion, and cost reduction. Process methods have been developed to enable blends containing materials having low bulk density (i.e., powders) and poor flow characteristics to be fed at commercially acceptable rates. Blends of this type can be extruded through dies of the appropriate configuration to produce building product type shapes previously made from wood. For example, U.S. Pat. Nos. 3,908,902, 4,091,153, 4,686,251, 4,708,623, 5,002,713, 5,055,247, 5,087,400, and 5,151,238 relate to processes for producing wood-like composites.

A major limitation of cellulosic fillers is the moisture sensitivity of cellulose fibers. This moisture sensitivity may require predrying of the cellulose fibers and the maintenance of low moisture conditions at the time of thermoplastic processing, particularly for cellulose in powder form. In addition, the moisture sensitivity of the cellulose fibers requires the exercise of special care during extrusion to ensure cellulosic encapsulation and/or protection against moisture absorption to avoid moisture deterioration of the cellulosic fibers. Furthermore, the extrusion process can cause thermal degradation of the cellulose fibers.

In light of these shortcomings, there is a need for a cellulosic composite with improved moisture resistance characteristics. Another need exists for a cellulosic composite that is less susceptible to thermal degradation. A need also exists for an improved cellulosic composite that includes inorganic fillers. Yet another need exists for a cellulosic, inorganic-filled composite that can be used as a substitute for natural wood, particle board, wafer board, and the like.

The present invention satisfies some or all of these needs. One embodiment of the present invention is a cellulosic, inorganic-filled plastic composite. The composite is comprised of cellulosic material, talc, and polyethylene. More particularly, the cellulosic material accounts for about 30% to about 70% by weight of the composite, the talc is about 1% to about 20% by weight of the composite, and the polyethylene is about 25% to about 40% by weight of the composite.

The present invention also includes an extruded article that is produced by extruding the aforementioned cellulosic, inorganic-filled plastic composite. The composite used to make the extruded article may include any of the optional or preferred features of the above-described composite.

Another embodiment of the present invention is a method of extruding a cellulosic, inorganic-filled plastic composite profile. The method comprises introducing a cellulosic, inorganic-filled plastic composite into an extruder. The composite may possess any of the optional or preferred features of the above-described cellulosic, inorganic-filled plastic composite. The composite is then melted and extruded through a profile die to form a profile. The profile is then cooled to achieve a final net shape.

In addition to the novel features and advantages mentioned above, other objects and advantages of the present invention will be readily apparent from the following description of the preferred embodiments.

DETAILED DESCRIPTION OF PREFERRED EMBODIMENT(S)

The present invention is a cellulosic, inorganic-filled plastic composite. The present invention also includes an extruded article made from the composite as well as a method of extruding the composite to form a profile.

The present invention replaces a portion of the cellulosic material with an inorganic filler. In broadest terms, the present invention includes a cellulosic, inorganic-filled plastic composite comprising about 30% by weight to about 70% by weight of the composite of cellulosic material, about 1% to about 20% by weight of the composite of talc, and about 25% to about 40% by weight of the composite of polyethylene.

The cellulosic material is preferably present in an amount in the range from about 40% to about 60% by weight of the composite, and more preferably from about 45% by weight to about 55% by weight. The talc is preferably present in an amount in the range from about 5% to about 15% by weight of the composite. In addition, the polyethylene is preferably high density polyethylene, and it is preferably present in an amount in the range from about 25% to about 35% by weight of the composite. The combination of the at least one cellulosic material and the talc is preferably present in an amount in the range from about 50% to about 80% by weight of the composite, and more preferably from about 55% by weight to about 65% by weight.

Preferably, the cellulosic material is selected from wood fiber, seed husks, ground rice hulls, newspaper, kenaf, and coconut shells. More preferably, the cellulosic material is wood fiber. It should be recognized that wood fiber is available in different forms. Other specific examples of cellulosic material include sawdust, alfalfa, wheat pulp, wood chips, wood particles, ground wood, wood flour, wood flakes, wood veneers, wood laminates, paper, cardboard, straw, cotton, peanut shells, bagass, plant fibers, bamboo fiber, palm fiber, or any other similar materials. Those skilled in the art should recognize that the cellulosic material of the present invention may be any suitable combination of different types of cellulosic material.

One preferred composite is comprised of about 50% to about 55% by weight of the composite of wood fiber, about 5% to about 10% by weight of the composite of talc, and about 30% to about 40% by weight of the composite of high density polyethylene. Another preferred composite is comprised of about 50% to about 55% by weight of the composite of wood fiber, about 10% to about 15% by weight of the composite of talc, and about 25% to about 30% by weight of the composite of high density polyethylene.

The invention also includes an extruded article produced by extruding the cellulosic, inorganic-filled plastic composite. The invention also includes a method of extruding the composite to form a profile. The method comprises introducing the composite as described above into an extruder, melting the composite, extruding the composite through a profile die to form a profile, and cooling the profile.

The following charts help to illustrate the optional and preferred features of the composite of the present invention.

| Ingredient | Range (by weight) | Preferred Range (by weight) | Most Preferred Range (by weight) |
|---|---|---|---|
| Cellulosic Material | 30–70% | 40–60% | 45–55% |
| Talc | 1–20% | 5–15% | |
| Polyethylene | 25–40% | 25–35% | |
| Combination of Cellulosic Material and Talc | 50–80% | 55–65% | |

Two preferred composites are:

| Ingredient | Amount (by weight) | Amount (by weight) |
|---|---|---|
| Wood fiber | 50–55% | 50–55% |
| Talc | 5–10% | 10–15% |
| High Density Polyethylene | 30–40% | 25–30% |
| Additives | 0–10% | 0–10% |

As indicated above, the composite of the present invention may include additives. Examples of additives include lubricants, process aids, cross-linking agents, accelerators, inhibitors, enhancers, compatibilizers, stabilizers, blowing agents, foaming agents, and other additives known in the art. Common commercial lubricants known in the plastics processing industry, both external and internal, can be used. Examples of lubricants which can be used include calcium stearate, zinc stearate, esters, paraffin wax, and amide wax. Examples of cross-linking agents include polyurethanes, such as isocyanates, phenolic resins, unsaturated polyesters, and epoxy resins.

A preferred embodiment of the composite can be made as follows. The wood fiber is preferably dried to between about 0.5% to about 3% in moisture content, and more preferably between about 1% and about 2% moisture by weight. The polyethylene is mixed with the dried wood fiber, talc, stabilizers, lubricants, and process aids in a low intensity mixer such as a ribbon blender. The mixture is preferably melted and processed in a conical, twin screw, counter-rotating extruder with a vent (for example, a Model CM80 extruder by Cincinnati Milacron). A force feed hopper (i.e., a crammer) is preferred to feed the mixture into the extruder, although other types of hoppers (e.g., a gravity feed hopper) may be used. A vacuum is preferably applied to the vent to further reduce the moisture in the extrudate. The extruder preferably forces the composite through a die or die system to obtain a final profile shape.

The operating temperatures for the first two stages of the extruder may be about 380° F., while the last two stages, which are located after the vent, may be about 350° F. The die temperature is preferably about 350° F., and the screw temperature is preferably about 360° F. Nevertheless, those skilled in the art should recognize that the temperatures of the extruder and the die may be varied to obtain optimum results for a particular extrusion.

The die design is preferably streamlined with a compaction ratio of between about 2:1 to about 4:1. It is preferred that the die system includes an extended die land. The extended die land preferably provides the necessary back pressure to obtain a uniform melt, as well as compaction and shaping of the melt.

The resultant product has an appearance similar to wood and may be sawed, sanded, shaped, turned, fastened and/or finished in the same manner as natural wood. The resultant product is resistant to rot and decay as well as termite attack. The resultant product may be used, for example, as decorative moldings inside or outside of a house, picture frames, furniture, porch decks, window moldings, window components, door components, roofing systems, and any other type of use where structural requirements do not exceed the physical properties of the resultant material.

Composites made according to the present invention offer several advantages over composites filled only with cellulosic material. For example, composites of the present invention show higher compound bulk density, higher extrusion rates, and less sensitivity to porosity. The composites of the present invention also show reduced moisture sensitivity in the extruded shape as well as reduced smoke and flame spread. In addition, the inorganic filler is readily available, and it has easily defined properties. Moreover, the inorganic filler typically does not require special drying, maintenance, or processing conditions.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A cellulosic, inorganic-filled plastic composite comprising:

about 30% to about 70% by weight of the composite of cellulosic material;

about 1% to about 20% by weight of the composite of talc; and about 25% to about 40% by weight of the composite of polyethylene.

2. The cellulosic, inorganic-filled plastic composite according to claim 1, wherein the cellulosic material is present in an amount in the range from about 40% to about 60% by weight of the composite.

3. The cellulosic, inorganic-filled plastic composite according to claim 1, wherein the cellulosic material is present in an amount in the range from about 45% to about 55% by weight of the composite.

4. The cellulosic, inorganic-filled plastic composite according to claim 1, wherein the talc is present in an amount in the range from about 5% to about 15% by weight of the composite.

5. The cellulosic, inorganic-filled plastic composite according to claim 1, wherein the polyethylene is present in an amount in the range from about 25% to about 35% by weight of the composite.

6. The cellulosic, inorganic-filled plastic composite according to claim 1, wherein the combination of the cellulosic material and the talc is present in an amount in the range from about 50% to about 80% by weight of the composite.

7. The cellulosic, inorganic-filled plastic composite according to claim 1, wherein the combination of the cellulosic material and the talc is present in an amount in the range from about 55% to about 65% by weight of the composite.

8. The cellulosic, inorganic-filled plastic composite according to claim 1, wherein the cellulosic material is selected from wood fiber, seed husks, ground rice hulls, newspaper, kenaf, and coconut shells.

9. The cellulosic, inorganic-filled plastic composite according to claim 1, wherein the polyethylene is high density polyethylene.

10. The cellulosic, inorganic-filled plastic composite according to claim 1, wherein the cellulosic material is wood fiber present in an amount in the range from about 50% to about 55% by weight of the composite, wherein the talc is present in an amount in the range from about 5% to about 10% by weight of the composite, and wherein the polyethylene is high density polyethylene present in an amount in the range from about 30% to about 40% by weight of the composite.

11. The cellulosic, inorganic-filled plastic composite according to claim 1, wherein the cellulosic material is wood fiber present in an amount in the range from about 50% to about 55% by weight of the composite, wherein the talc is present in an amount in the range from about 10% to about 15% by weight of the composite, and wherein the polyethylene is high density polyethylene present in an amount in the range from about 25% to about 30% by weight of the composite.

12. An extruded article, said article produced by extruding a cellulosic, inorganic-filled plastic composite, the composite comprising:

about 30% to about 70% by weight of the composite of cellulosic material;

about 1% to about 20% by weight of the composite of talc; and about 25% to about 40% by weight of the composite of polyethylene.

13. An extruded article according to claim 12, wherein the cellulosic material is present in an amount in the range from about 40% to about 60% by weight of the composite.

14. An extruded article according to claim 12, wherein the cellulosic material is present in an amount in the range from about 45% to about 55% by weight of the composite.

15. An extruded article according to claim 12, wherein the talc is present in an amount in the range from about 5% to about 15% by weight of the composite.

16. An extruded article according to claim 12, wherein the polyethylene is present in an amount in the range from about 25% to about 35% by weight of the composite.

17. An extruded article according to claim 12, wherein the combination of the cellulosic material and the talc is present in an amount in the range from about 50% to about 80% by weight of the composite.

18. An extruded article according to claim 12, wherein the combination of the cellulosic material and the talc is present in an amount in the range from about 55% to about 65% by weight of the composite.

19. An extruded article according to claim 12, wherein the at least one cellulosic material is selected from wood fiber, seed husks, ground rice hulls, newspaper, kenaf, and coconut shells.

20. An extruded article according to claim 12, wherein the polyethylene is high density polyethylene.

21. An extruded article according to claim 12, wherein the cellulosic material is wood fiber present in an amount in the range from about 50% to about 55% by weight of the composite, wherein the talc is present in an amount in the range from about 5% to about 10% by weight of the composite, and wherein the polyethylene is high density polyethylene present in an amount in the range from about 30% to about 40% by weight of the composite.

22. An extruded article according to claim 12, wherein the cellulosic material is wood fiber present in an amount in the range of from about 50% to about 55% by weight of the composite, wherein the talc is present in an amount in the range from about 10% to about 15% by weight of the composite, and wherein the polyethylene is high density polyethylene present in an amount in the range from about 25% to about 30% by weight of the composite.

23. A method of extruding a cellulosic, inorganic-filled plastic composite profile, the method comprising:

introducing a cellulosic, inorganic-filled plastic composite into an extruder, the cellulosic, inorganic-filled plastic composite comprising:

about 30% to about 70% by weight of the composite of cellulosic material;

about 1% to about 20% by weight of the composite of talc; and about 25% to about 40% by weight of the composite of polyethylene;

melting the cellulosic, inorganic-filled plastic composite;

extruding the melted cellulosic, inorganic-filled plastic composite through a profile die to form a profile; and cooling the profile.

24. A method according to claim 23, wherein the cellulosic material is present in an amount in the range from about 40% to about 60% by weight of the composite.

25. A method according to claim 23, wherein the cellulosic material is present in an amount in the range from about 45% to about 55% by weight of the composite.

26. A method according to claim 23, wherein the talc is present in an amount in the range from about 5% to about 15% by weight of the composite.

27. A method according to claim 23, wherein the polyethylene is present in an amount in the range from about 25% to about 35% by weight of the composite.

28. A method according to claim 23, wherein the combination of the cellulosic material and the talc is present in an amount in the range from about 50% to about 80% by weight of the composite.

29. A method according to claim 23, wherein the combination of the cellulosic material and the talc is present in an amount in the range from about 55% to about 65% by weight of the composite.

30. A method according to claim 23, wherein the cellulosic material is selected from wood fiber, seed husks, ground rice hulls, newspaper, kenaf, and coconut shells.

31. A method according to claim 23, wherein the polyethylene is high density polyethylene.

32. A method according to claim 23, wherein the cellulosic material is wood fiber present in an amount in the range from about 50% to about 55% by weight of the composite, wherein the talc is present in an amount in the range from about 5% to about 10% by weight of the composite, and wherein the polyethylene is high density polyethylene present in an amount in the range from about 30% to about 40% by weight of the composite.

33. A method according to claim 23, wherein the cellulosic material is wood fiber present in an amount in the range of from about 50% to about 55% by weight of the composite, wherein the talc is present in an amount in the range from about 10% to about 15% by weight of the composite, and wherein the polyethylene is high density polyethylene present in an amount in the range from about 25% to about 30% by weight of the composite.

* * * * *